Aug. 31, 1937.  G. D. ROBINSON  2,091,882
SECURING DEVICE
Filed May 20, 1937
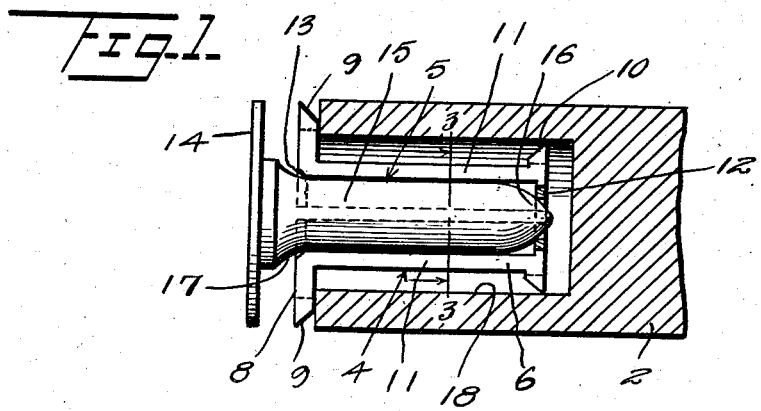
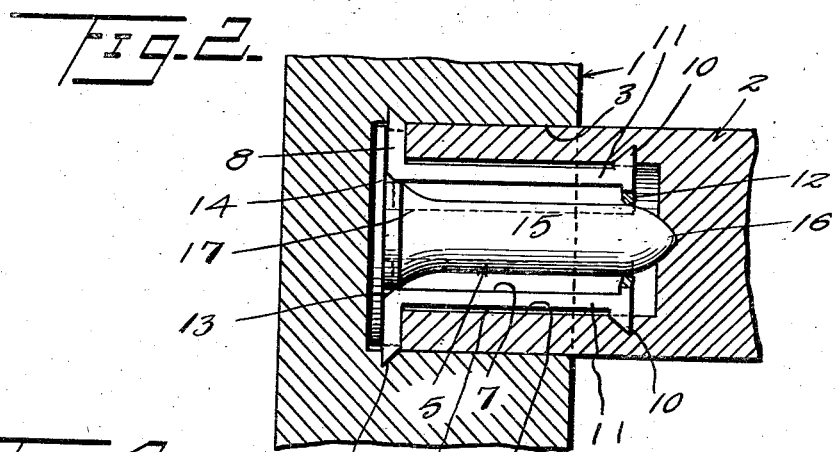
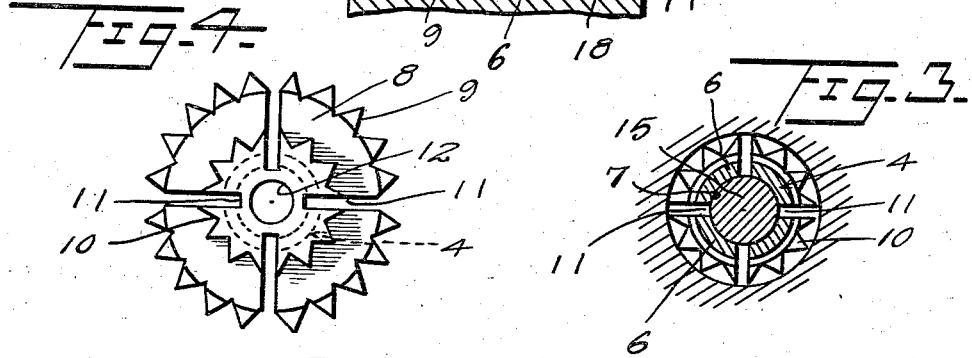
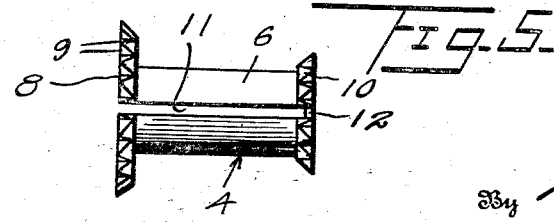
Inventor
G. D. Robinson
By Watson E. Coleman
Attorney Patented Aug. 31, 1937

2,091,882

UNITED STATES PATENT OFFICE 2,091,882

SECURING DEVICE

Guilford D. Robinson, Eden, N. Y.

Application May 20, 1937, Serial No. 143,807

7 Claims. (Cl. 20—92)

This invention relates to the class of connecting devices designed primarily for facilitating the quick and permanent attachment of two bodies together particularly in cases where one body has a portion inserted into the other.

The present invention has for its primary object to provide a coupling device for securing an end of a dowel in an aperture as, for example, for connecting the ends of chair rungs with the legs, whereby the connection may be quickly made without the use of cements or other adhesives and will be of a permanent character.

A further object of the invention is to provide a device for securing an end of a rung in an aperture in a supporting body wherein two relatively movable parts of the device are so constructed and arranged that after being mounted in a suitable aperture in the end of the rung and the rung is driven into a receiving aperture in a leg or other supporting body, the two parts of the device will shift in such a manner as to effect the penetration of certain portions of one of the parts into both of the joined bodies and thereby permanently couple the same together.

A still further object is to provide a device for the purpose and of the character stated, which is of simple construction so that it may be easily and economically made and which will be positive in its action in connecting together the two parts with which it is associated.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a section taken longitudinally through an end of a rung showing the device embodying the present invention in preliminary position therein, a portion of the device being in longitudinal section;

Figure 2 is a sectional view corresponding to Figure 1 and additionally showing the end of the rung in a recess in a supporting leg and showing the final position of the parts of the securing device;

Figure 3 is a sectional view taken on the line 3—3 of Figure 1;

Figure 4 is a bottom plan view of the connector proper;

Figure 5 is a view in side elevation of the connector without the spreader.

Referring now more particularly to the drawing, wherein like numerals of reference designate corresponding parts throughout the several views, the numeral 1 indicates a body of wood which may represent the leg of a chair while the numeral 2 indicates a rung having an end inserted in the usual manner in a bore or passage 3 in the leg. While the present description is directed particularly to the use of the device in joining chair rungs with legs it is believed obvious that the device may be used in other ways for connecting together two bodies as, for example, it may be used for joining the rungs to the side pieces of a ladder or in any other place where one element is inserted into an aperture in another and, therefore, it is to be understood it is not to be limited to use in the construction or repair of chairs.

The device generally comprises the coupling unit which is generally indicated by the numeral 4 and the wedge unit which is generally indicated by the numeral 5 and which acts on the coupling unit to force teeth thereof into the two pieces which are to be joined together.

The coupling unit consists of the elongated body portion 6 which is preferably of cylindrical cross section, and which has the longitudinal aperture 7 formed therethrough. At one end the body 6 has formed integral therewith the flat head 8, the periphery of which is serrated or toothed, as indicated at 9, while the opposite end of the body is encircled by the teeth 10 which join directly onto the body instead of being coupled therewith through the medium of a head as are the teeth 9. It will thus be seen that the circle of teeth 9 is of greater diameter than the circle of teeth 10 and the purpose for this will be hereinafter made clear.

The body 6 is provided with a series of longitudinally extending slots 11 which are formed therein from the head end and which completely divide the body into a series of segments which are joined at the inner end by the interior flange 12 which provides a camming surface or seat for a portion of the unit 5 as hereinafter specifically described, and at the outer end of the passage 7 a beveled surface 13 is formed which also constitutes a camming area for a part of the body 5.

The unit or body 5 consists of a top or outer plate 14 from the center of which extends the pin 15. The end of the pin is tapered to form the spreader nose 16 and adjacent the plate 14 the pin is enlarged to form the encircling cam surface 17. This pin 15 is of slightly greater length than the body 6 and is of a diameter to enter the passage 7 and force outwardly the portions of the body so that it will be firmly frictionally held in place therein.

In the use of the present rung holder the usual aperture 3 is made in the body 1 which is to receive the end of the rung and the rung is provided in its end with the socket 18 which is of a length to receive the body 6 of the unit 4, with the head portion 8 resting against the end of the rung. The spreader unit 5 then has its pin portion 15 inserted into the passage 7 so as to bring the beveled surface of the nose 16 against the inner flange 12 and the cam portion 17 against the cam seat 13. The end of the rung is then introduced into the opening 3 and by the use of a hammer or other suitable driving instrument, a blow is applied to the side of the body 1 over the end of the rung 2 thus forcing the rung further into the opening 3 and forcibly spread apart the several parts of the body 6 through the action of the cams 16 and 17 respectively against the flange 12 and seat 13. The material of the flange 12 is relatively thin so that the pressure applied by the blow upon the chair leg will stretch the metal to permit of the separation of the parts of the body 6 and when this occurs the teeth 10 at the inner end of the body will be forced into the material of the rung at the bottom of the opening 18 and the teeth 9 encircling the head 8 will be forced into the wall of the passage 3 thus establishing through the medium of the body 6 a permanent connection between the rung and leg as illustrated in Figure 2.

From the foregoing it will be readily apparent that a device of the character herein described can be employed to quickly couple bodies of the character described without the use of glue or other adhesive means so that the structure of which the members 1 and 2 form a part may be put into use at once. It will also be apparent that with the present device a positive coupling is established without leaving on view any part of the medium through which the coupling is made.

I claim:—

1. A connector for two bodies wherein one is inserted into an opening in the other, comprising a unit consisting of a plurality of separable portions and adapted to be inserted into a socket in the inserted body, means carried by and movable relative to the unit for separating said parts thereof, penetrating members carried by said body, and means forming a part of said separating unit whereby the latter when forcibly inserted into the body will separate the portions thereof and effect an engagement of said penetrating members with the two first mentioned bodies.

2. A device for securing together two bodies in which one body is provided with an aperture to receive the other body, said other body being provided with a socket in that portion entering the aperture, comprising an elongated tubular unit longitudinally slotted through a major portion of its length to divide it into a plurality of sections, said unit being inserted in the socket of the second mentioned body, a flat head forming an integral part of one end of the unit, teeth forming a part of said head, teeth formed about the other end of said unit, means forming camming surfaces on said unit, and a pin member insertable into said unit and having cam portions adapted to engage said camming surfaces to effect a separation of the parts of said unit and the penetration of said teeth into the adjacent b'ies.

3. A securing device for making a connection of the character described, comprising a tubular body longitudinally slit from one end to form a plurality of portions which are connected together at one end only of the body, said body at each end having an internal cam seat, a series of penetrating members encircling the body at each end, the circular area defined by one series being of materially greater diameter than the area defined by the other series, and means insertable in the body formed to provide cam portions for contact with said seats whereby forcible separation of said portions may be effected to effect penetration of said members into an encircling structure.

4. A device for securing an end of a rung in a socket, comprising a unit insertable in a recess in an end of the rung, penetrating members integral with the unit at each of two remote points, the members at one point only being insertable into the recess, and means for effecting penetration of those members lying within the recess into the material of the rung and simultaneous penetration of the other members into the material in which the socket is formed.

5. A device for securing a recessed end of a rung in a socket, comprising an elongated expansible unit adapted to have one end inserted into the recess, means upon the inserted end of the unit for penetrating the wall of the recess, penetrating elements carried by the other end of the unit and lying outside of the recess, and means for effecting the expansion of the unit when the recessed end of the rung is forcibly inserted into the socket to effect the said penetration of the first mentioned members into the recessed wall and simultaneous penetration of the second mentioned penetrating members into the wall of the socket.

6. A securing device adapted to be mounted upon an end of a body designed for insertion into a recess in a receiving body, comprising a member adapted to be carried by the end of the inserted body, two sets of teeth carried by said member, and means operating upon the forcible insertion of the said end of the first member into said recess to effect the penetration of one set of teeth into the first mentioned member and the simultaneous penetration of the other set of teeth into the recessed member.

7. A device for securing a recessed end of a rung in a socket of a receiving member, comprising an elongated tubular member longitudinally divided from one end through a portion of its length to provide a plurality of relatively movable sections, a camming surface formed within the tubular member, a plurality of teeth encircling said member at one end and adapted to enter the recess with the member, a flat head carried upon the other end of the member and having a plurality of peripheral teeth, a pin insertable into the tubular member, and cam means forming a part of the pin adapted to engage said cam seat to effect relative movement of said portions when the recessed end is inserted into the socket whereby penetration of the teeth at the inserted end of the member into the wall of the recess is effected together with simultaneous penetration of said peripheral teeth into the wall of the socket.

GUILFORD D. ROBINSON.